Patented Nov. 10, 1942

UNITED STATES PATENT OFFICE 2,301,286

PROCESS OF MAKING AN N N' DIANTHRAQUINONYL NAPHTHALENEDIAMINE

Walter Kern, Sissach, Paul Sutter, Binningen, and Richard Tobler, Riehen, Switzerland, assignors to Society of Chemical Industry in Basle, Basel, Switzerland No Drawing. Application December 19, 1938, Serial No. 246,754 In Switzerland December 20, 1937

5 Claims. (Cl. 260—368)

This invention relates to the manufacture of valuable nitrogenous naphthalene derivatives by causing a halogenated naphthalene containing at least two halogen atoms, one at least of which is in β-position, to react with a compound which contains at least one hydrogen atom united to nitrogen and groups capable of being vatted.

The naphthalenes containing at least two halogen atoms which serve as parent materials for the invention may also contain as substituents for instance alkoxy groups, for example methoxy groups. The halogen atoms may be linked to the naphthalene nucleus in any desired position, provided one atom takes a 2-, 3-, 6- or 7-position, for example in 1:6-, 2:6- or 4:6-position. Further substituents such as alkyl groups with one to several carbon atoms can also be present. Moreover, two, three or four halogen atoms may be linked to the naphthalene nucleus as indicated above, for example in the 1:3:6-tribromonaphthalene or the 1:3:6:8-tetrabromonaphthalene. Among others there come into question 2:6-dibromo-, 2:6-dichloro and 1:6-dibromo-2-methoxy-naphthalene.

For reacting with such halogenated naphthalenes there may be used various compounds, for instance aromatic compounds, containing in the molecule at least one hydrogen atom united to nitrogen and groups capable of being vatted; if desired, two or more molecules of the same or different compounds as just defined may be caused to act simultaneously or in succession with 1 molecule of the halogenated naphthalene. Suitable compounds are especially amines containing carbonyl groups which are cyclic bound. Such amines may be anthraquinone derivatives or may belong to more highly condensed ring systems; examples are amino anthraquinones, for instance 1-aminoanthraquinone and 1-aminoarylaminoanthraquinones, aminoacylaminoanthraquinones, wherein the acyl residue may be for instance the residue of an aliphatic, aromatic or heterocyclic acid, like carboxylic acid, for instance 1-amino-4-benzoylaminoanthraquinone, 1-amino-5-benzoylaminoanthraquinone, 1-amino-5-benzoylamino-8-methoxyanthraquinone, 1-amino-5:8-dibenzoylaminoanthraquinone, 1-aminoanthraquinonoylaminoanthraquinone, aminopyranthrones, aminoanthanthrones, aminoperylenequinones, aminodianthrones, amino-N-dihydroanthraquinone-azines, aminoanthraquinoneazines, aminobenzpyrenequinones, aminoflavanthrenes, and aminodibenzanthrones; further aminoanthraquinone derivatives of which the 1- and 9-positions are members of a heterocyclic ring, for instance amino-1:9-anthrapyrimidines, amino-1:9-anthrapyridones, amino-1:9-isothiazoleanthrones and amino-1:9-pyrazoleanthrones; finally aminoanthraquinone derivatives in which two carbon atoms in ortho-position to each other are members of a heterocyclic ring system, for instance amino-1:2-anthraquinone-acridones. Any of these compounds may contain substituents.

An addition to the above mentioned aminoacylaminoanthraquinones there may also be used acylamino compounds in which the radical of the benzoic acid, or the radical of an anthraquinone carboxylic acid, is replaced by the radical of another acid, for example by the radical of acetic acid, propionic acid, butyric acid, stearic acid, phenylacetic acid, cinnamic acid, oxalic acid, succinic acids, naphthalene carboxylic acids, phthalic acids, pyridine and quinoline carboxylic acids.

The reaction of the halogen naphthalene with the amine containing at least one reactive hydrogen atom may be conducted with advantage by heating the components in solution or in a diluent, for example amyl alcohol, nitrobenzene or naphthalene and preferably in presence of a catalyst, for instance copper or a copper compound as well as of an agent that binds acid. All the halogen atoms present may be caused to react in one stage or successively in several stages.

The naphthalene derivatives obtainable by the invention are useful as body colors for various purposes. They are moreover in many cases valuable intermediate products for the manufacture of vat dyestuffs, whereas some are vat-dyestuffs themselves. They correspond to the general formula $$R_1—(NH—R_2)_n$$

wherein $n$ stands for at least the number 2, $R_1$ stands for a naphthalene radical and each $R_2$ stands for a radical containing groups capable of being vatted, and wherein at least one $R_2$—NH-group is linked in β-position to the naphthalene radical. Those products are of particular importance in which the radical $R_2$ an ortho-position to the NH-group capable of being substituted is occupied by hydrogen.

The following examples illustrate the invention, the parts being by weight, the relationship between parts by weight and parts by volume being that which exists between the kilo and the liter:

Example 1

14.3 parts of 2:6-dibromonaphthalene, 24.5 parts of 1-aminoanthraquinone, 15 parts of anhydrous sodium acetate, 15 parts of anhydrous sodium carbonate and 1.3 parts of cuprous chloride are together suspended in 450 parts of dry nitrobenzene and the whole is stirred for 24 hours at a temperature of 190–200° C. The mixture is then filtered hot and the solid matter washed with nitrobenzene as well as with benzene and alcohol and then purified by extraction first with boiling dilute hydrochloric acid and then with boiling alcohol. There is thus obtained in good yield a violet-black crystalline powder of the probable formula

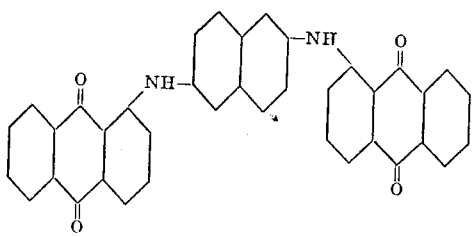

which colors concentrated sulfuric acid olive green. It melts at 370–380° C. and is not capable of being vatted. The 2:6-dibromonaphthalene used in this example may be made as follows:

70 parts of 2-amino-6-bromonaphthalene are diazotized in the usual manner with 23 parts of sodium nitrite and the diazo solution is heated to 50° C., with cuprous bromide. The mixture foams and the 2:6-dibromonaphthalene separates. This is filtered, washed and recrystallized from chloroform or glacial acetic acid, whereby colorless crystals melting at 158° C. are obtained.

*Example 2*

4.3 parts of 2:6-dibromonaphthalene, 10.5 parts of 1-amino-5-benzoylaminoanthraquinone, 4.5 parts of calcined sodium carbonate, 4.5 parts of anhydrous sodium acetate and 0.4 part of cuprous chloride are together suspended in 90 parts of dry nitrobenzene and the mixture is kept for 16 hours at a temperature of 190—200° C. It is then filtered hot and the solid matter is washed with nitrobenzene, benzene and alcohol and purified by extraction with boiling dilute hydrochloric acid. There is thus obtained in good yield a brown crystalline powder of the probable formula

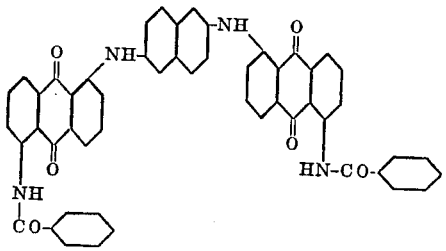

soluble in concentrated sulfuric acid to a grass green solution and melting above 350° C. Analysis shows it to be a di(5'-benzoyl-amino-1'-anthraquinonyl)-2:6-diaminonaphthalene.

The 2:6-dibromonaphthalene used in this example may be made from 2:6-diaminonaphthalene as follows:

63.2 parts of 2:6-diaminonaphthalene are tetrazotized in the usual manner by means of 56 parts of sodium nitrite and the tetrazo-solution is heated with cuprous bromide at 70° C. The solution foams and 2:6-dibromonaphthalene separates. It has the properties named in Example 1.

*Example 3*

13 parts of anhydrous sodium carbonate, 15 parts of anhydrous sodium acetate and 500 parts of nitrobenzene are heated together to boiling until 50 parts of nitrobenzene have distilled. After cooling to 200° C., there are added 14.3 parts of 2:6-dibromonaphthalene, 35.2 parts of 1-amino-4-benzoylaminoanthraquinone and 1.3 parts of cuprous chloride. The mixture is stirred for 24 hours at 195–205° C. It is then filtered hot, the solid matter washed with nitrobenzene and with benzene and alcohol and further purified by extraction with boiling dilute hydrochloric acid. After again filtering, washing and drying there is obtained in good yield a brownish black crystalline powder which colors concentrated sulfuric acid olive green, melts above 350° C. and is not capable of being vatted. Analysis shows it to be di(4-benzoylamino-1'-anthraquinonyl)-2:6-diaminonaphthalene of the formula

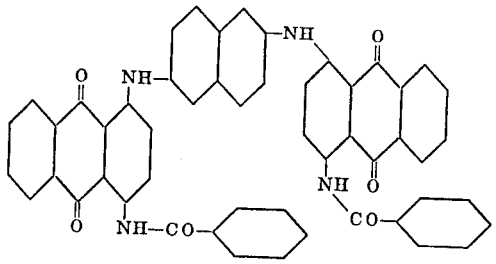

*Example 4*

2.5 parts of 2:6-dibromonaphthalene, 5.4 parts of 1-amino-5-acetylaminoanthraquinone, 2.3 parts of anhydrous sodium carbonate, 2.3 parts of anhydrous sodium acetate and 0.2 part of cuprous chloride are together suspended in 72 parts of dry nitrobenzene and the whole is heated to boiling while stirring. When the reaction is complete, the mass is filtered hot and the solid matter washed with nitrobenzene, benzene and alcohol and then extracted with boiling dilute acid, filtered, washed and dried. There is obtained in good yield a brown-black power of the probable formula

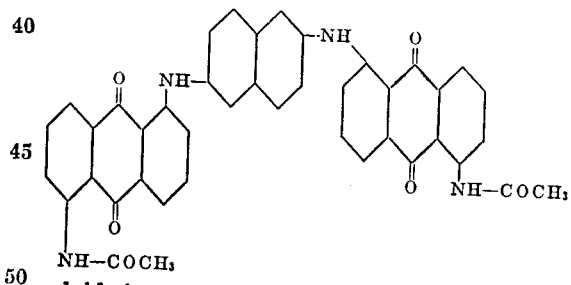

soluble in concentrated sulfuric acid to a brown-olive solution; it does not melt at 450° C. and cannot be vatted.

In like manner there is obtained from 1 mol 2:6-dibromonaphthalene and 2 mols 1-amino-5-(ortho'-chloro)-benzoylaminoanthraquinone a brown-black powder which does not melt at 460° C. and cannot be vatted. Also from 1 mol 2:6-dibromonaphthalene and 2 mols 1-amino-5-(meta'-chloro)-benzoylaminoanthraquinone a brown-black powder soluble in concentrated sulfuric acid to a brown-olive green solution and incapable of being vatted is obtained.

The product of the reaction of 1 mol 2:6-dibromonaphthalene with 2 mols 1-amino-5-(para'-chloro)-benzoylaminoanthraquinone is a brown-black powder soluble in concentrated sulfuric acid to an olive-green solution; it does not melt at 460° C. and is incapable of being vatted.

In like manner there is obtained from 1 mol 2:6-dibromonaphthalene and 2 mols 1-amino-5-(para'-methoxy)-benzoylaminoanthraquinone a brown-black powder soluble in concentrated sulfuric acid to an olive green solution; it does not melt at 460° C. and cannot be vatted.

Example 5

14.3 parts of 2:6-dibromonaphthalene, 35.2 parts of 4-aminoanthraquinone-2:1(N)-benzacridone, 15 parts of anhydrous sodium carbonate, 15 parts of anhydrous sodium acetate and 1.5 parts of cuprous chloride are suspended in 450 parts of dry nitrobenzene and the whole is heated for 24 hours at 200–206° C. When reaction is complete, the mass is filtered hot and the residue washed with nitrobenzene, benzene and alcohol and then extracted with boiling dilute acid, filtered, washed and dried. The dyestuff obtained in a good yield is a green-black powder of the probable formula

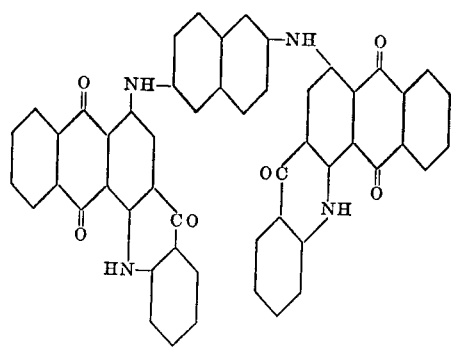

soluble in sulfuric acid to a brown-red solution; it does not melt at 460° C. and dyes cotton in a Bordeaux colored vat green tints.

Example 6

2.86 parts of 2:6-dibromonaphthalene, 7.1 parts of 5-aminoanthraquinone-2:1-(N)-benzacridone, 3 parts of anhydrous sodium carbonate, 3 parts of anhydrous sodium acetate and 0.26 part of cuprous chloride are suspended in 90 parts of dry nitrobenezene and the whole is stirred for 24 hours at 195–200° C. When reaction is complete, the whole is filtered hot, the residue is washed with nitrobenzene, benzene and alcohol and then extracted with boiling dilute hydrochloric acid, filtered and dried. The dyestuff obtained in good yield is a blue-black powder of the probable formula

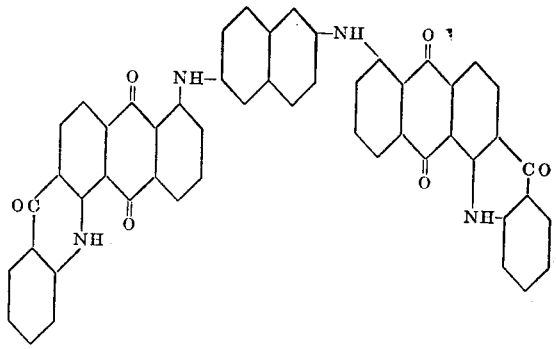

soluble in concentrated sulfuric acid to a red solution; it does not melt at 460° C. and dyes cotton in a red-violet vat blue-violet fast tints.

Example 7

5.72 parts of 2:6-dibromonaphthalene, 13.7 parts of 1-amino-4-anilinoanthraquinone, 6 parts of anhydrous sodium carbonate, 6 parts of anhydrous sodium acetate and 0.52 part of cuprous chloride are suspended in 180 parts of dry nitrobenzene and the whole is stirred for 24 hours at 195–200° C. When reaction is complete, the product obtained is worked up in the manner described in the previous examples. There is obtained a black-blue crystalline powder melting with decomposition at 380–390° C. and incapable of being vatted and soluble in concentrated sulfuric acid to a blue solution.

Analysis shows it to be di-(4'-anilino-1'-anthraquinonyl)-2:6-diaminonaphthalene of the formula

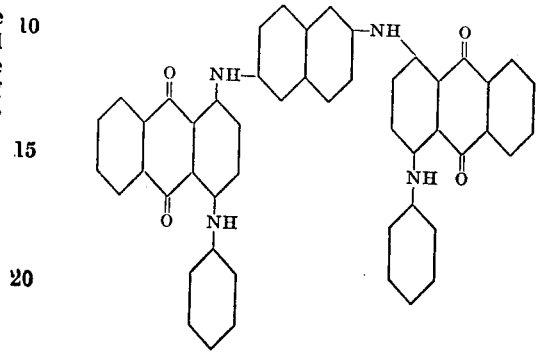

By the corresponding reaction of 1 mol 2:6-dibromonaphthalene with 2 mols 1-amino-4-methoxyanthraquinone there is obtained a black-blue powder which does not melt at 460° C., dissolves in concentrated sulfuric acid to a green solution and is incapable of being vatted.

Example 8

14.3 parts of 2:6-dibromonaphthalene are caused to react with 51 parts of aminodibenzanthrone in presence of 1.3 parts of cuprous chloride, 15 parts of anhydrous sodium carbonate and 15 parts of anhydrous sodium acetate in 480 parts of boiling, dry nitrobenzene. The product worked up in the manner previously described is a black powder of the probable formula

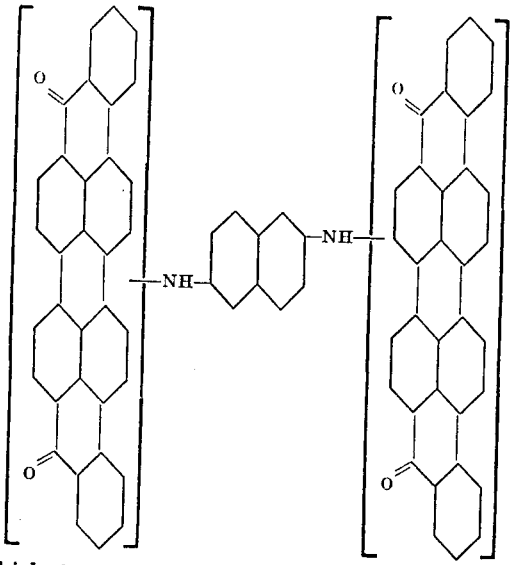

which does not melt at 460° C., dissolves in concentrated sulfuric acid to a yellow-green solution and dyes cotton in a blue vat grey-green tints.

Example 9

5.72 parts of 2:6-dibromonaphthalene, 12.1 parts of 4-amino-N-methyl-1:9-anthrapyridone, 6 parts of anhydrous sodium carbonate, 6 parts of anhydrous sodium acetate and 0.52 part of cuprous chloride are heated together for 24 hours with 180 parts of dry nitrobenezene at about 200° C. The whole is filtered hot and the solid matter purified in the manner described above. There is obtained a blue-black crystalline powder of the probable formula

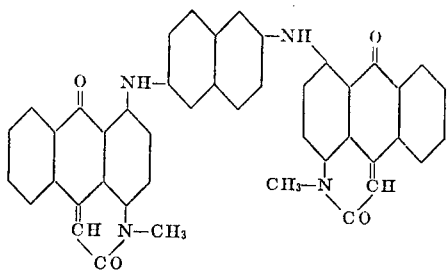

soluble in concentrated sulfuric acid to a violet solution which does not melt at 460° C. and cannot be vatted.

In corresponding manner there is obtained from 1 mol 2:6-dibromonaphthalene and 2 mols 5-amino-isothiazole-anthrone a black-violet crystalline powder of the probable formula

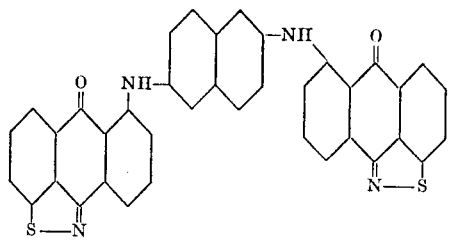

which melts above 390° C., dissolves in concentrated sulfuric acid to a yellow-green solution and connot be vatted.

With 4-aminopyrazole-anthrone there is obtained a brown power of the probable formula

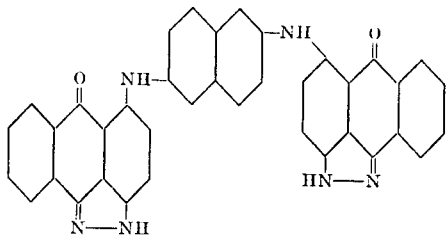

which does not melt at 460° C., dissolves in concentrated sulfuric acid to a brown solution and cannot be vatted.

*Example 10*

2.86 parts of 2:6-dibromonaphthalene, 5.43 parts of 5-amino-1:9-anthrapyrimidine, 3 parts of anhydrous sodium acetate, 3 parts of anhydrous sodium carbonate and 0.26 part of cuprous chloride are together heated to boiling while stirring with 90 parts of dry nitrobenzene. The whole is filtered hot and the solid matter purified in the manner described above. There is obtained in good yield a black-blue crystalline powder of the probable formula

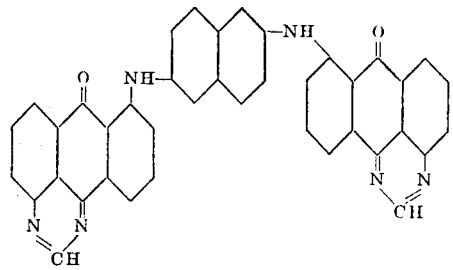

soluble in concentrated sulfuric acid to a yellow-green solution; it does not melt at 460° C. and dyes cotton in a yellow-brown vat blue tints.

*Example 11*

14.3 parts of 2:6-dibromonaphthalene, 35.4 parts of aminoanthanthrone, 15 parts of anhydrous sodium carbonate, 15 parts of anhydrous sodium acetate and 1.3 parts of cuprous chloride are together heated at 200–205° C. while stirring in 480 parts of dry nitrobenzene for 24 hours. The whole is filtered hot and the solid matter purified as described above. There is obtained in good yield a dark blue powder of the probable formula

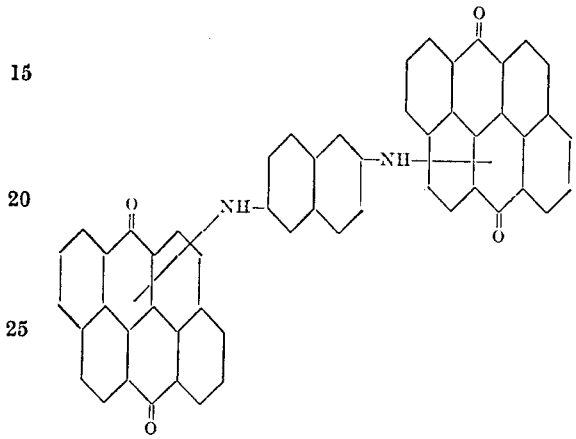

soluble in concentrated sulfuric acid to a brown-green solution which does not melt at 640° C. and dyes cotton in a violet vat brown-violet tints.

*Example 12*

5.8 parts of 2:6-dibromonaphthalene, 7 parts of 1-amino-5-benzoylaminoanthraquinone, 3 parts of anhydrous sodium carbonate, 3 parts of anhydrous sodium acetate and 0.25 part of cuprous chloride are together suspended in 145 parts of dry nitrobenzene and the mixture is heated to 155–160° C. for 16 hours while stirring. It is then filtered hot. From the filtrate there separates on cooling, but completely only after addition of alcohol, a dark powder soluble in concentrated sulfuric acid to a green solution and incapable of being vatted.

If this body is caused to react in the usual manner with a second mol of 1-amino-5-benzoylaminoanthraquinone there is obtained the same product as is obtained in Example 2.

*Example 13*

1 mol of the product obtained as described in paragraph 1 of Example 12 may be caused to react in the usual manner with 1 mol of 1-amino-4-benzoylamino-anthraquinone. There is thus obtained a brown-black crystalline powder of the probable formula

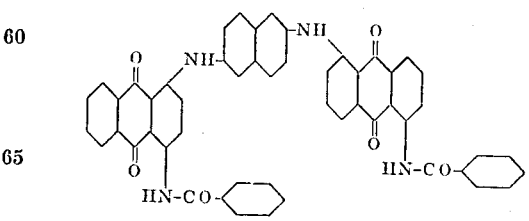

soluble in concentrated sulfuric acid to a green solution, melting above 300° C. and incapable of being vatted.

A similar product can be obtained by causing 1 mol 2:6-dibromonaphthalene to react simultaneously with 1 mol each of 1-amino-5-benzoylaminoanthraquinone and 1-amino-4-benzoyl-aminoanthraquinone.

If in Example 12 paragraph 1 there is used 1-amino-4-benzoylaminoanthraquinone instead of 1-amino-5-benzoylaminoanthraquinone there is obtained a black-brown powder soluble in concentrated sulfuric acid to a green solution and incapable of being vatted. If this product is caused to react in the usual manner with 1 mol 1-amino-5-benzoylaminoanthraquinone, there is obtained the same product as is obtained by following paragraph 1 of the present example.

*Example 14*

36 parts of the product of the reaction of 1 mol 2:6-dibromonaphthalene and 1 mol 1-amino-5-benzoylaminoanthraquinone obtained as described in paragraph 1 of Example 12, 19 parts of 4-amino-1:9-anthrapyrimidine, 20 parts of anhydrous sodium carbonate, 20 parts of anhydrous sodium acetate and 2 parts of cuprous chloride are together suspended in 650 parts of dry nitrobenzene and the mixture is heated while stirring for 24 hours at 200–206° C. and is then filtered hot. From the filtrate there separates on cooling a dark brown powder of the probable formula

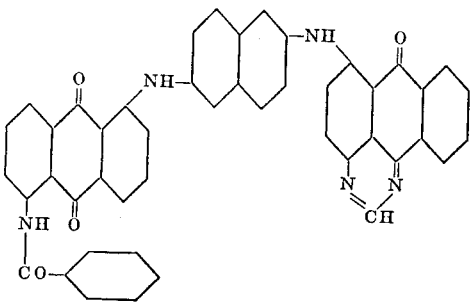

soluble in concentrate sulfuric acid to a brown solution and only with difficulty converted into a vat.

*Example 15*

2.86 parts of 2:6-dibromonaphthalene, 3.4 parts of 5-aminoanthraquinone-2:1-(N)-benzacridone, 2 parts of anhydrous sodium carbonate, 2 parts of anhydrous sodium acetate and 0.2 part of cuprous chloride are suspended together in 90 parts of dry nitrobenzene and the whole is heated while stirring for 24 hours at 150° C. and then for 5 hours at 170° C. The whole is filtered hot, whereupon there separates from the filtrate on cooling a product which is filtered, washed with nitrobenzene, benzene and alcohol and dried. There is thus obtained a blue-black powder soluble in concentrated sulfuric acid to a red-brown solution; it melts at a temperature higher than 250° C. and dyes cotton in a blue-violet vat red-violet tints.

If this body is allowed to react in the usual manner with 1 mol of 1-aminoanthraquinone there is obtained a black powder of the probable formula

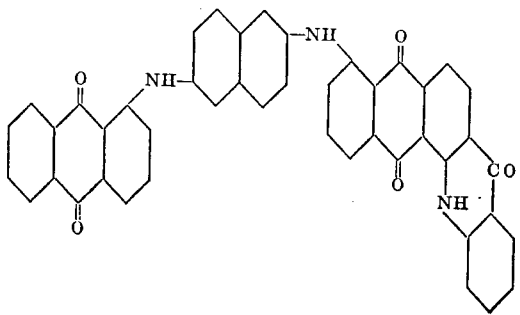

soluble in concentrated sulfuric acid to a brown solution; it does not melt at 460° C. and dyes cotton in a violet vat violet tints.

*Example 16*

18 parts of anhydrous sodium acetate and 18 parts of anhydrous sodium carbonate are together heated to boiling in 480 parts of nitrobenzene until 48 parts of the latter have distilled. After cooling to 190–200° C. (oil bath temperature), 19.1 parts of 1:6-dibromo-2-methoxynaphthalene, 43.5 parts of 1-amino-5-benzoylaminoanthraquinone and 1.8 parts of cuprous chloride are added and the whole is stirred for 40 hours at 193–203° C. After filtering hot, the solid matter is washed with nitrobenzene and with benzene and alcohol and is purified by extraction with boiling dilute hydrochloric acid. After again filtering the solid matter is washed and dried. There is obtained in very good yield a dark brown powder soluble in concentrated sulfuric acid to an olive green turning to red-brown; it melts above 300° C. and may be vatted to a brown solution. Analysis shows it to be di-(5'-benzoylamino-1'-anthraquinonyl) -1:6-diamino-2-methoxynaphthalene of the formula

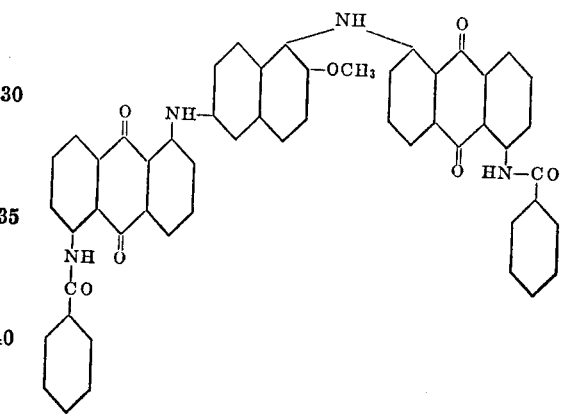

If instead of 1-amino-5-benzoylaminoanthraquinone there is used 1-amino-4-benzoylaminoanthraquinone there is obtained a black-blue product which dissolves in concentrated sulfuric acid to a red-brown solution; it melts above 300° C. and dyes cotton in an olive vat bluish-gray tints.

The condensation product from 1-mol 1:6-dibromo-2-methoxynaphthalene and 2 mols 1-aminoanthraquinone is a dark brown crystalline powder soluble in concentrated sulfuric acid to a brown-green solution and dyeing cotton in a red-orange vat Bordeaux tints.

*Example 17*

1 part of the dyestuff produced as described in Example 6 is made into a paste with 6 parts by volume of caustic soda solution of 36° Bé. and 100 parts of water at 40–50° C., 2 parts of hydrosulfite are added and vatting is continued for ½ hour at the above temperature. The dye bath is prepared with 3 parts by volume of caustic soda solution of 36° Bé., 1 part of hydrosulfite, the quantity of water necessary to make 2000 parts by volume, including the stock vat, and then adding the stock vat. 50 parts of cotton are entered, handled for ¼ hour and dyed for one hour at 50–60° C., then wrung out, oxidized for ½ hour by exposure to air, rinsed, soured and soaped at the boil. Cotton is dyed blue-violet tints.

Example 18

2 parts of the dyestuff described in Example 10 are made into a paste with 12 parts of caustic soda solution of 30° Bé. and 200 parts of water at 60° C. and then vatted by addition of 5 parts of hydrosulfite at the said temperature. This stock vat is added to a dye bath containing 2500 parts of water, 3 parts of caustic soda solution of 36° Bé. and 1 part of hydrosulfite. 100 parts of cotton are entered at 40° C. and dyeing is continued for ½ hour at 40–50° C. There are then added 50 parts of common salt and dyeing is continued for a further ½ hour at the said temperature. An oxidation and finishing is conducted as described in Example 17. Cotton is dyed blue tints.

What we claim is:

1. Process for the manufacture of nitrogenous naphthalene derivatives, comprising reacting 2:6-dibromonaphthalene with 1-aminoanthraquinones.
2. Process for the manufacture of nitrogenous naphthalene derivatives, comprising reacting 2:6-dibromonaphthalene with 1-amino-acylamino-anthraquinones.
3. Process for the manufacture of nitrogenous naphthalene derivatives, comprising reacting 1 mol of 2:6-dibromonaphthalene with 2 mols of 1-aminobenzoylaminoanthraquinones.
4. Process for the manufacture of nitrogenous naphthalene derivatives, comprising reacting 1 mol of 2:6-dibromonaphthalene with 2 mols of 1-amino-5-benzoylaminoanthraquinone.
5. Process for the manufacture of nitrogenous naphthalene derivatives, comprising reacting 1 mol of 2:6-dibromonaphthalene with 1 mol of 1-amino-4-benzoylaminoanthraquinone and 1 mol of 1-amino-5-benzoylaminoanthraquinone.

WALTER KERN.
PAUL SUTTER.
RICHARD TOBLER.